US006968685B2

(12) United States Patent
Stall

(10) Patent No.: US 6,968,685 B2
(45) Date of Patent: Nov. 29, 2005

(54) HYDRAULIC DRIVE

(75) Inventor: Eugen Stall, Neunkirchen (DE)

(73) Assignee: STILL GmbH, (DE)

( * ) Notice: Subject to any disclaimer, the term of this patent is extended or adjusted under 35 U.S.C. 154(b) by 48 days.

(21) Appl. No.: 10/737,156

(22) Filed: Dec. 16, 2003

(65) Prior Publication Data

US 2004/0182232 A1 Sep. 23, 2004

(30) Foreign Application Priority Data

Dec. 17, 2002 (DE) .............................. 102 59 038

(51) Int. Cl.[7] .......................... F15B 15/22; F16D 31/02
(52) U.S. Cl. ............................ 60/468; 91/402; 91/409
(58) Field of Search .......................... 60/487, 485, 484, 60/468; 91/409, 405, 402

(56) References Cited

U.S. PATENT DOCUMENTS

| | | | |
|---|---|---|---|
| 4,432,270 A | 2/1984 | Kyster et al. | |
| 5,020,618 A | 6/1991 | Nagao | |
| 6,131,389 A | 10/2000 | Sørensen | |

FOREIGN PATENT DOCUMENTS

| | | |
|---|---|---|
| EP | 0 407 768 A1 | 1/1991 |
| EP | 1 046 570 A2 | 10/2000 |
| FR | 2 482 680 | 11/1981 |
| JP | 09 039 818 | 2/1997 |

*Primary Examiner*—Edward K. Look
*Assistant Examiner*—Michael Leslie
(74) *Attorney, Agent, or Firm*—The Webb Law Firm

(57) ABSTRACT

A hydraulic drive (1) has a position selection device (2) in communication with a control valve (3) which, as a function of the actuation of the position selection device (2), controls the connection of an actuating cylinder (8) with a hydraulic fluid source (5) and a reservoir (6). A correction device provides a synchronization between the position of the position selection device (2) and the position of the actuating cylinder (8). The correction device has a sliding valve means (15) which detects a reference range of the actuating cylinder (8) and an on-off valve means (16) effectively connected mechanically with the position selection device (2). The on-off valve means (16) is open when the position selection device (2) is in the reference range and is closed when the position selection device (2) is not in the reference range.

17 Claims, 3 Drawing Sheets

HYDRAULIC DRIVE

CROSS REFERENCE TO RELATED APPLICATION

This application corresponds to German Application No. 102 59 038.9 filed Dec. 17, 2002, which is herein incorporated by reference in its entirety.

BACKGROUND OF THE INVENTION

1. Field of the Invention

This invention relates to a hydraulic drive having a steering motor with a position selection device, such as a steering angle transmitter, which is in communication with a control valve, such as a steering valve, which as a function of the actuation of the position selection device controls the connection to a user (i.e., an actuating cylinder), such as a steering cylinder, with a hydraulic fluid source and a reservoir. A correction device provides a synchronization between the position of the position selection device and the position of the user.

2. Technical Considerations

In utility vehicles such as construction machinery and industrial trucks, hydraulic drives in the form of steering motors having a steering valve actuated by a steering angle transmitter, such as a steering wheel, control the pressurization of a steering cylinder that is in effective communication with the steered wheels on a steering axle. In steering motors of this type, there can be differences between the position of the steering motor and the position of the steering angle transmitter, e.g., the steering wheel, as a result of leaks at the steering valve and/or the steering cylinder.

As a result of these leaks, the rotational position of the steering wheel and the position of the steering cylinder and thus the position of the steered wheels will not always be the same, i.e., will not always be synchronized. Particularly for the straight-ahead position of the steering motor, there may be different rotational positions of the steering wheel on account of the above-mentioned leaks. These differences can lead to unpleasant situations for the operator of a utility vehicle that is equipped with these systems since there is no consistent and unambiguous correspondence between the rotational position of the steering wheel and the position of the steered wheels. In addition, systems of the known art can lead to hazardous operating situations if the operator of the steering angle transmitter selects a straight-ahead position, for example, but the vehicle travels on a curved path as a result of the lack of synchronization between the position of the steering angle transmitter and the position of the steering motor. This operational behavior of hydraulic steering devices can also force the operator to constantly change the position of the steering angle transmitter to keep the vehicle traveling straight ahead over long distances. This requires increased concentration on the part of the operator of such a vehicle, which can rapidly tire the operator. Therefore, it would be advantageous to provide a hydraulic steering motor for which there is always a defined position of the steering wheel when the vehicle is supposed to be traveling straight ahead.

To synchronize the position of the steering angle transmitter with the position of the steering cylinder in hydraulic steering devices and, thus, to make possible a synchronization between the position of the steering angle transmitter and the position of the steering cylinder, correction devices are known that make it possible to adjust the position of the steering cylinder to the position of the steering angle transmitter. In correction devices of the known art, an absolute sensor located on the steering angle transmitter is used to determine the position of the steering angle transmitter and, thus, the setpoint for the steering angle. The current value of the steering angle is determined by means of an absolute sensor that is located on the steering cylinder. These absolute sensors are effectively connected with an electronic control system in which a constant and continuous comparison between the setpoint and the measured value of the steering angle is performed. When there is a difference between the position of the steering cylinder and the position of the steering angle transmitter, the electronic control system establishes a synchronization between the steering cylinder and the steering angle transmitter by pressurizing the steering cylinder. Absolute sensors of this type, such as proportional sensors which detect the position of the steering angle transmitter and the position of the steering cylinder, and the corresponding electronic control system are relatively expensive to manufacture. As a result of which, a hydraulic steering motor with a conventional correction device is likewise expensive to manufacture.

The known art also describes correction devices in which the adjustment of the steering cylinder to the straight-ahead position of the steering angle transmitter is limited. On one known correction device, a sliding valve is provided on the steering cylinder. This makes it possible to connect the steering cylinder with the reservoir if the steering cylinder is not in the straight-ahead position. The position of the steering angle transmitter, i.e., of the steering wheel, is determined by a sensor effectively connected with an electronic control system. The control system controls an electrically actuated on-off valve located in the connection between the sliding valve with the reservoir. The connection established by the sliding valve between the steering cylinder and the reservoir is opened when the steering angle transmitter is in the straight-ahead position.

However, correction devices of this type are complex to design and expensive to manufacture on account of their electrical and/or electronic components, such as the sensors and the electronic control system. Moreover, steering motors for industrial trucks are generally exposed to harsh environmental conditions. Therefore, demanding requirements are set for the reliability, useful life, and operational safety of the correction device. As a result of which, the electronic components must be heavy-duty and must be installed in a protected location on the industrial truck, which requirements further increase the complexity of the design.

Therefore, it is an object of the invention to provide a hydraulic drive with a correction device which has a high level of reliability and operational safety and a long useful life but is simultaneously relatively economical to design and manufacture.

SUMMARY OF THE INVENTION

The invention teaches that the correction device includes a sliding valve means which detects a reference range of the actuating cylinder and, when the actuator is not in the reference range, makes possible a compensation of the hydraulic fluid in the actuating cylinder. The correction device further includes an on-off valve means. e.g., an on-off valve, mechanically connected with the position selection device. The on-off valve has a closed position which blocks the compensation of the hydraulic fluid and an open position which makes possible the compensation of the hydraulic fluid. When the position selection device is in the reference range, the on-off valve is actuated into the open position and when the position selection device is not in the reference range, the on-off valve is pushed into the closed position. The invention, therefore, teaches that heavy-duty hydraulic control elements that are mechanically actuated, economical, and can function under harsh environmental conditions can be used for the synchronization of the position of the actuating cylinder to the position of the position selection device with respect to the reference range. The hydraulic drive can thus be provided easily and economically with a correction device that works safely and reliably under harsh environmental conditions. As a result of which, high levels of reliability, operational safety, and a long useful life can be achieved with relatively little design effort and at a low manufacturing cost.

In one embodiment of the invention, the hydraulic fluid equalization can be accomplished by a connection between the actuating cylinder and the reservoir that is controlled by the sliding valve means, whereby the sliding valve means makes it possible to establish a connection between the actuating cylinder and the reservoir when the actuating cylinder is not in the reference range. As a result of the discharge of hydraulic fluid from the actuating cylinder, it is easily possible to adjust the position of the actuating cylinder to the position of the position selection device when it is in the reference range, and when the actuating cylinder is outside the reference range, to adjust the position of the actuating cylinder to the position of the position selection device.

There are particular advantages if the on-off valve is located in the connection that can be established by the sliding valve means between the actuating cylinder and the reservoir. With this switching arrangement of the on-off valve, the discharge of hydraulic fluid from the actuator cylinder can easily be restricted to operating conditions in which the position selection device is in the reference range and, thus, the on-off valve is actuated into the open position, and in which the actuating cylinder is in a position that is outside the reference range, in which case the on-off valve connects the actuating cylinder with the reservoir.

In one advantageous embodiment of the invention, the sliding valve means is integrated into the actuating cylinder.

A simple construction can be achieved if the sliding valve means has a hydraulic fluid connection that is located in the reference range on the actuating cylinder and is in communication with a hydraulic fluid line that makes possible the equalization of the hydraulic fluid, whereby the hydraulic fluid connection can be actuated by a piston of the actuating cylinder. A sliding valve means can thereby be produced easily in which, when the actuating cylinder is in the reference range, the connection to the reservoir is closed, and in which, when the actuating cylinder is outside the reference range, the communication from the corresponding control pressure chamber of the actuating cylinder to the hydraulic fluid connection that is in communication with the reservoir is created for the hydraulic fluid discharge via the on-off valve.

Particular advantages can be achieved if, in accordance with one development of the invention, a throttle device is provided on the piston and/or on the hydraulic fluid connection and/or in the hydraulic fluid line. It is easily possible to achieve a desired control and switching characteristic of the sliding valve means with a fixed or variable throttle device. The throttle device can be located in the hydraulic fluid connection or in the hydraulic fluid line. It is also possible to configure the throttle device in the form of a control edge on the piston, to achieve a control cross section which is a function of the deviation of the actuating cylinder from the reference range. In this manner, as the deviation of the actuating cylinder from the reference range increases, an increasing compensation rate can be achieved by an increasing control cross section.

In one embodiment, the invention is realized in the form of an on-off valve that is effectively connected mechanically with the position selection device. With a mechanically controlled on-off valve, it is possible to open the hydraulic fluid line that is controlled by the sliding valve in a simple manner when the position selection device is in the reference range, or to close the hydraulic fluid line when the position selection device is outside the reference range.

It is particularly advantageous if, as in one embodiment of the invention, the on-off valve is a rotary sliding valve. When the drive is a steering motor with a position selection device that is realized in the form of a steering angle transmitter, such as a steering wheel for example, the on-off valve is less complex to design when it is in the form of a rotary sliding valve.

The on-off valve can thereby be easily realized in the form of an on-off valve in the form of a rotary sliding valve if the rotary valve is provided with a control edge which opens the connection for the adjustment of the amount of hydraulic fluid in the actuating cylinder in the reference range of the position selection device.

The mechanical connection of the on-off valve with the position selection device can be made less complex if the on-off valve is located on the control valve.

The complexity of the construction can be further reduced if the on-off valve is integrated into the control valve. All that is necessary is an additional control edge on the control valve, by means of which the connection of the actuating cylinder with the reservoir can be controlled.

In one advantageous configuration of the invention, the reference range is in the vicinity of the neutral position of the actuating cylinder and/or of the position selection device, in particular in the range of the straight-ahead position of the steering cylinder and/or of the steering angle transmitter. When the vehicle is a construction vehicle or an industrial truck, the straight-ahead position is used with great frequency during operation. As a result of the intermittent synchronization of the steering motor in the straight-ahead position which is used with great frequency in the operation of the vehicle, it is thereby possible in a simple manner to ensure that a synchronization of the position of the steering cylinder and the position of the steering angle transmitter will be achieved during operation of the utility vehicle.

Particular advantages result from the use of the invention in an industrial truck, in particular a fork lift truck. On an industrial truck, a synchronization of the position of the steering angle transmitter and the position of the steering angle can be achieved with a high level of reliability and operational safety and a long useful life and with a non-complex design by using mechanically controlled hydraulic valves exclusively.

BRIEF DESCRIPTION OF THE DRAWINGS

Additional advantages and details of the invention are explained in greater detail below with reference to the exemplary embodiment illustrated in the accompanying schematic drawings, in which.

DESCRIPTION OF THE PREFERRED EMBODIMENTS

Figure 1:
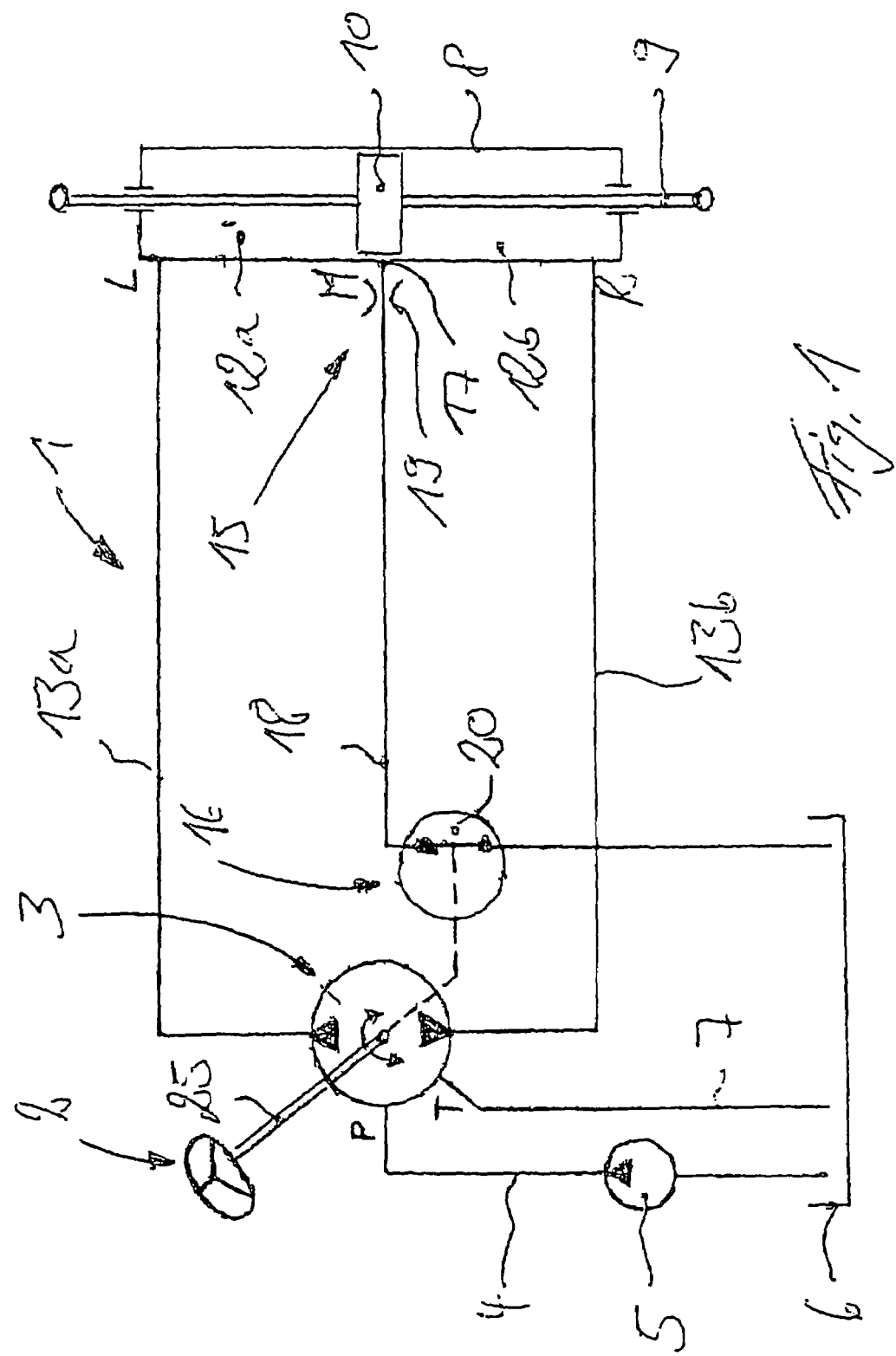
FIG. 1 shows a first exemplary embodiment of a hydraulic drive according to the invention in the form of a steering motor.

FIG. 1 shows a first exemplary embodiment of a hydraulic motor that is realized in the form of a steering motor 1 for a utility vehicle, such as an industrial truck.

The steering motor 1 has a position selection device 2 that is realized in the form of a steering angle transmitter (such as a steering wheel, for example) and is effectively connected with a control valve 3 (such as a steering valve, for example) by a linkage 25 that is realized in the form of a steering column. The control valve 3 can be a rotary sliding valve and is in communication with a delivery line 4 of a hydraulic fluid source 5 (such as a pump) and is connected to the input side with a reservoir 6. The control valve 3 is also connected to a reservoir line 7 that leads to the reservoir 6.

Figure 3:
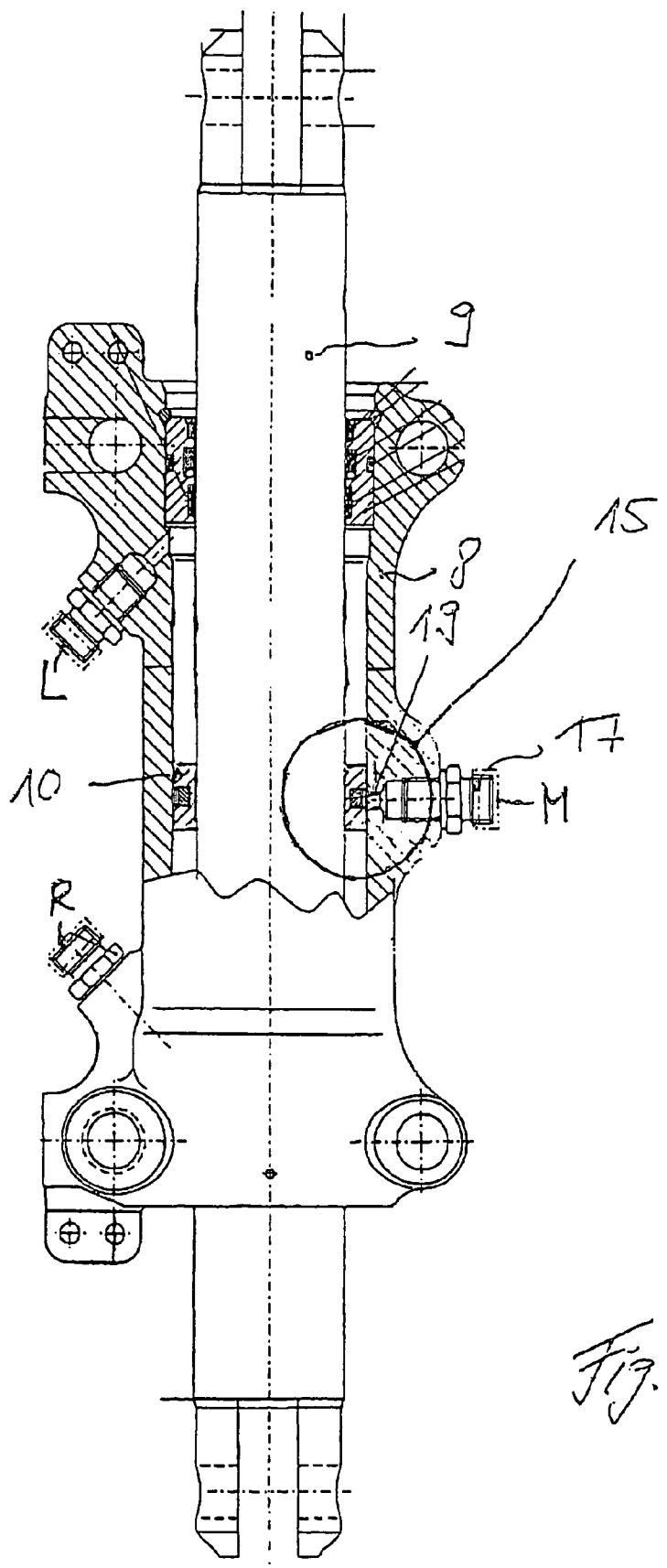
FIG. 3 shows the actuating cylinder of a drive of the invention.

The steering motor 1 also has a dual-action actuating cylinder 8 that is realized in the form of a steering cylinder, and can be located in any conventional manner on a steering axle and is effectively connected with the steered wheels. The actuating cylinder 8, as shown in FIG. 3, has a piston 10 on a cylinder rod 9 and divides the actuating cylinder 8 (as shown in FIG. 1) into a first control pressure chamber 12a and a second control pressure chamber 12b. The control valve 3 is in communication with the first control pressure chamber 12a by a control line 13a. The second control pressure chamber 12b is in connection with the control valve 3 by means of a second control line 13b.

The invention teaches that the steering motor 1 is provided with a correction device that comprises a sliding valve means 15 and an on-off valve means 16.

The sliding valve means 15 is integrated into the actuating cylinder 8 and comprises a hydraulic fluid connection 17 which is located in the straight-ahead position as a reference range. A hydraulic fluid line 18 that leads to the reservoir 6 is connected to the hydraulic fluid connection 17. The hydraulic fluid connection 17 can thereby be actuated by the piston 10 of the actuating cylinder 8 so that when the piston 10 is in a reference range, i.e., in the illustrated straight-ahead position of the steering cylinder, the hydraulic fluid connection 17 is closed. When the piston 10 is in a position other than in the reference range, e.g., when there is a sufficiently large deviation of the piston 10 from the straight-ahead position, the control pressure chamber 12a or 12b is in communication with the hydraulic fluid line 18. A throttle device 19 is provided on the hydraulic fluid connection 17 or in the hydraulic fluid line 18. The throttle device 19, as illustrated in FIG. 3, can easily be realized in the form of a throttle boring on the actuating cylinder 8.

The on-off valve means 16 is located in the hydraulic fluid line 18 and is realized in the form of an on-off valve 20 with a closed position and an open position. The on-off valve 20 is effectively connected mechanically with the position selection device 2. The on-off valve 20 is thereby appropriately connected with the linkage 25. In the reference range, i.e., when the position selection device 2 is in the illustrated straight-ahead position, the on-off valve 20 is in the open position. When the position selection device 2 is in a position other than in the reference range, the on-off valve 20 is actuated into the closed position in which the hydraulic fluid line 18 is interrupted.

Figure 2:
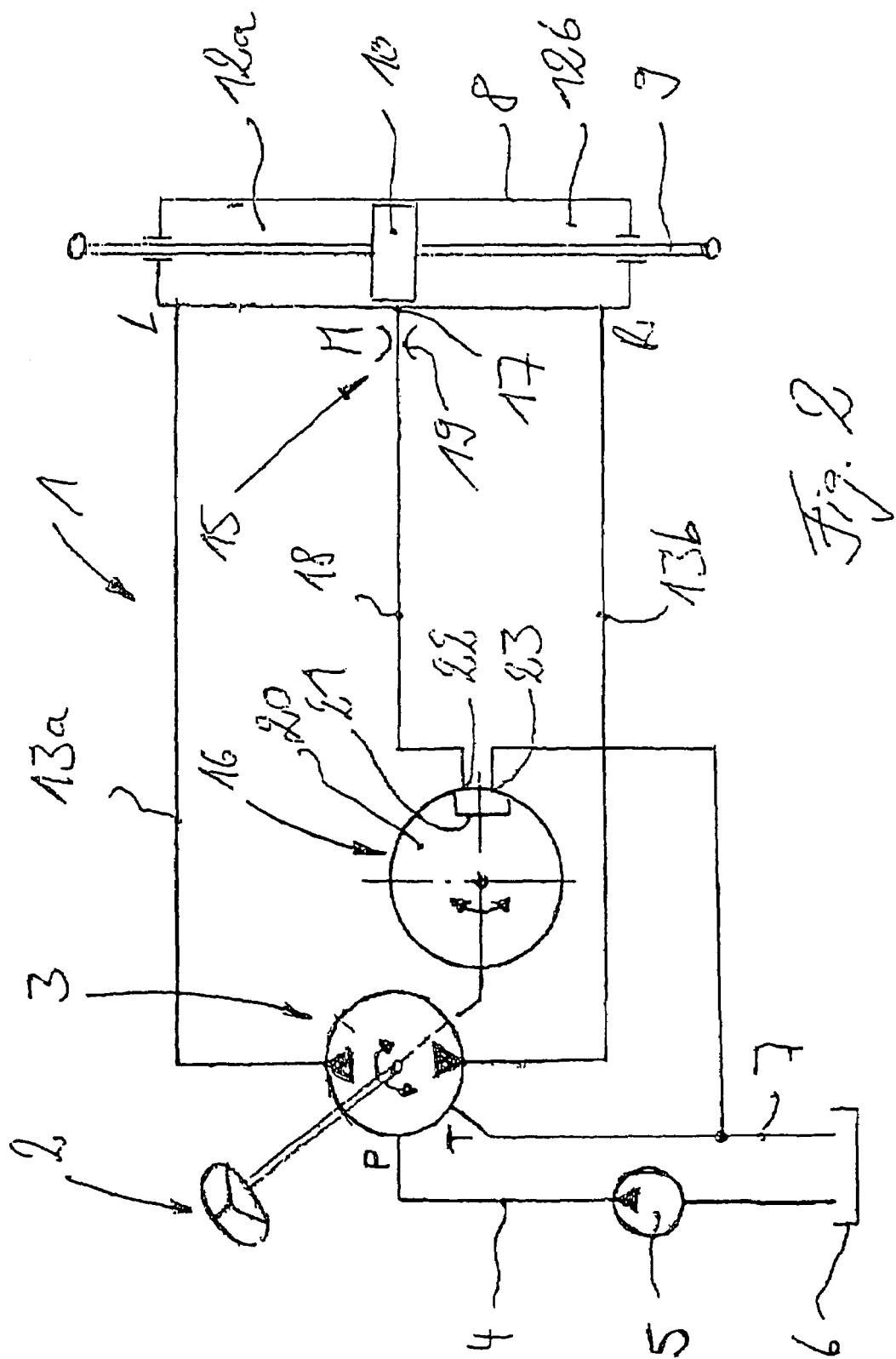
FIG. 2 shows a second exemplary embodiment of a hydraulic drive according to the invention in the form of a steering motor.

FIG. 2 illustrates a second exemplary embodiment of the invention with an on-off valve 20 realized in the form of a rotary sliding valve. The rotary sliding valve is effectively connected mechanically with the position selection device 2, for example by means of the linkage 25. The rotary sliding valve is provided with a control edge 21, such as a control channel, for example, whereby the rotary sliding valve, in the vicinity of the control channel 21, has a (first) hydraulic fluid connection 22 to which is connected the segment of the hydraulic fluid line 18 that leads to the actuating cylinder 8, and another (second) hydraulic fluid connection 23 to which is connected the segment of the hydraulic fluid line 18 that leads to the reservoir 6. In the illustrated straight-ahead position, when the position selection device 2 is in the reference range, the hydraulic fluid connections 22, 23 are in communication via the control channel 21, as a result of which the hydraulic fluid line 18 from the actuating cylinder 8 to the reservoir 6 is opened. The rotary sliding valve is, thus, in the open position. When the position selection device 2 is in a position other than in the reference range, the excursion of the rotary sliding valve from the hydraulic fluid connection 22 or 23 from the control channel 21 is accordingly blocked, as a result of which the hydraulic fluid line 18 is shut off. The rotary sliding valve is, therefore, in the closed position.

The hydraulic fluid line 18 can be connected to the reservoir line 7 as illustrated in FIG. 2.

The on-off valve 20 can be realized in the form of a separate valve which is installed on the control valve 3. It is also possible, in particular when the on-off valve 20 is realized in the form of a rotary sliding valve, to integrate the on-off valve 20 into the control valve 3 which is realized in the form of a rotary sliding valve. The hydraulic fluid line 18 from the on-off valve 20 to the reservoir line 7 can thereby be realized inside the control valve 3.

The steering motor 1 with the correction device of the invention works as follows:

When the position selection device 2 and the actuating cylinder 8 are in the reference range, i.e., when the steering motor 1 is in the straight-ahead position, the on-off valve 20 is actuated into the open position and the sliding valve means 15 is closed because the piston 10, as illustrated in FIG. 3, shuts off the hydraulic fluid connection, e.g., throttle 19.

If, when the position selection device 2 is in the reference range, the piston 10 has a sufficiently large deviation from the straight-ahead position illustrated as the reference range in the accompanying figures, the piston 10 connects the corresponding control pressure chamber 12a or 12b to the hydraulic fluid line 18, as a result of which hydraulic fluid can flow out of the control pressure chamber 12a or 12b, through the hydraulic fluid line 18 and the on-off valve 20, which is in the open position, to the reservoir 6. The piston 10 can then be actuated back into the straight-ahead position and, thus, into the reference range, as a result of which the position of the actuating cylinder 8 is synchronized with the position of the position selection device 2.

The synchronization is restricted by the on-off valve 20 to a narrow range around the reference range and, thus, the straight-ahead position of the position selection device 2. If the steering angle on the position selection device 2, which is realized in the form of the steering angle transmitter, is large enough, the on-off valve 20 is actuated into the closed position, in which no synchronization is possible.

The speed of the adjustment of the actuating cylinder 8 can be set by means of an appropriate design of the throttle device 19. On a steering motor 1, an excessively rapid adjustment of the steering cylinder with the resulting sudden steering movements of the utility vehicle can be prevented by an appropriate design of the throttle device 19.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A hydraulic drive, comprising:
   a position selection device in communication with a control valve which, as a function of the actuation of the position selection device, controls the connection of an actuating cylinder with a hydraulic fluid source and a reservoir; and
   a correction device providing synchronization between the position of the position selection device and the position of the actuating cylinder,
   wherein the correction device includes:
      a sliding valve means which detects a reference range of the actuating cylinder and, when the actuating cylinder is not in the reference range, provides an equalization of hydraulic fluid in the actuating cylinder; and
      an on-off valve means which is connected with the position selection device, which has a closed position that shuts off the hydraulic fluid equalization and an open position that makes possible the hydraulic fluid equalization,
      wherein the on-off valve means is actuated into the open position when the position selection device is in the reference range and is actuated into the closed position when the position selection device is not in the reference range, and
      wherein the on-off valve means is a rotary sliding valve connected with the position selection device.

2. The hydraulic drive as claimed in claim 1, wherein the hydraulic fluid equalization can be established by a connection between the actuating cylinder and the reservoir that can be controlled by the sliding valve means, and wherein the sliding valve means provides a connection between the actuating cylinder and the reservoir when the actuating cylinder is not in the reference range.

3. The hydraulic drive as claimed in claim 2, wherein the on-off valve means is located in the connection between the actuating cylinder and the reservoir that can be established by the sliding valve means.

4. The hydraulic drive as claimed in claim 1, wherein the sliding valve means is integrated into the actuating cylinder.

5. The hydraulic drive as claimed in claim 4, wherein the sliding valve means includes a hydraulic fluid connection located in the reference range on the actuating cylinder, which hydraulic fluid connection is in communication with a hydraulic fluid line that makes possible the hydraulic fluid equalization, whereby the hydraulic fluid connection can be actuated by a piston of the actuating cylinder.

6. The hydraulic drive as claimed in claim 5, including a throttle device on the actuating cylinder or on the hydraulic fluid connection or in the hydraulic fluid line.

7. The hydraulic drive as claimed in claim 1, wherein the rotary sliding valve includes a control edge which opens the connection for the hydraulic fluid equalization of the actuating cylinder and that can be controlled by the sliding valve means when the position selection device is in the reference range.

8. The hydraulic drive as claimed in claim 1, wherein the on-off valve is located on the control valve.

9. The hydraulic drive as claimed in claim 1, wherein the on-off valve is integrated into the control valve.

10. The hydraulic drive as claimed in claim 1, wherein the reference range is in the vicinity of the neutral position of the actuating cylinder and/or of the position selection device.

11. The hydraulic drive as claimed in claim 1, mounted in an industrial truck.

12. The hydraulic drive as claimed in claim 1, wherein the hydraulic drive comprises a steering motor.

13. The hydraulic drive as claimed in claim 1, wherein the position selection device comprises a steering angle transmitter.

14. The hydraulic drive as claimed in claim 1, wherein the control valve is a steering valve.

15. The hydraulic drive as claimed in claim 1, wherein the actuating cylinder is a steering cylinder.

16. The hydraulic drive as claimed in claim 1, wherein the reference range is in the vicinity of the straight-ahead position of a steering cylinder and/or of the steering angle transmitter.

17. The hydraulic drive as claimed in claim 13, wherein the industrial truck is a fork lift truck.

* * * * *